(12) United States Patent
Low

(10) Patent No.: US 11,360,218 B2
(45) Date of Patent: Jun. 14, 2022

(54) WIDE FIELD-OF-VIEW LIDAR OPTICAL ASSEMBLY AND SYSTEM

(71) Applicant: Aptiv Technologies Limited, St. Michael (BB)

(72) Inventor: Yew Kwang Low, Singapore (SG)

(73) Assignee: Aptiv Technologies Limited, St. Michael (BB)

( * ) Notice: Subject to any disclaimer, the term of this patent is extended or adjusted under 35 U.S.C. 154(b) by 918 days.

(21) Appl. No.: 16/145,579

(22) Filed: Sep. 28, 2018

(65) Prior Publication Data

US 2020/0096643 A1 Mar. 26, 2020

Related U.S. Application Data

(60) Provisional application No. 62/734,401, filed on Sep. 21, 2018.

(51) Int. Cl.
*G01S 7/481* (2006.01)
*G01S 17/42* (2006.01)
(Continued)

(52) U.S. Cl.
CPC .......... *G01S 17/931* (2020.01); *G01S 7/4817* (2013.01); *G01S 17/42* (2013.01); *G01S 17/89* (2013.01); *G02B 26/105* (2013.01)

(58) Field of Classification Search
CPC ...... G01S 17/931; G01S 7/4817; G01S 17/42; G01S 17/89; G01S 7/4814; G01S 7/481; G02B 26/105
See application file for complete search history.

(56) References Cited

U.S. PATENT DOCUMENTS 5,463,468 A * 10/1995 Takanashi ............ H04N 9/3164
358/296
6,144,397 A * 11/2000 Chiba ................ B23K 26/0608
257/E23.179
(Continued)

FOREIGN PATENT DOCUMENTS

| DE | 102006006837 A1 | 9/2006 |
| EP | 3182160 A1 | 6/2017 |
| WO | 2013/056703 A2 | 4/2013 |

OTHER PUBLICATIONS

English Translation of EP 3182160A1, published Jun. 21, 2017.
European Search Report for Application No. EP19193642, European Patent Office, dated Feb. 12, 2020.

*Primary Examiner* — Yuqing Xiao
*Assistant Examiner* — Vladislav Levenets
(74) *Attorney, Agent, or Firm* — Sawtooth Patent Group PLLC

(57) ABSTRACT

A lidar system includes a laser-source configured to emit laser-beams, and a single movable-mirror positioned to reflect the laser-beams from the laser-source. The movable-mirror is operable to pivot about a single rotation-axis. The system includes a first-optical wedge configured to direct at least a first-laser-beam reflected by the movable-mirror in a first-direction with respect to a bore-axis of the system, and a second-optical-wedge configured to direct at least a second-laser-beam reflected by the movable-mirror in a second-direction with respect to the bore-axis, where the second-direction is different from the first-direction. The system also includes a first-shutter interposed between the first-optical-wedge and the movable-mirror, and a second-shutter interposed between the second-optical-wedge and the movable-mirror.

20 Claims, 2 Drawing Sheets

(51) Int. Cl.
*G01S 17/89* (2020.01)
*G02B 26/10* (2006.01)
*G01S 17/931* (2020.01)

(56) References Cited

U.S. PATENT DOCUMENTS

| | | | |
|---|---|---|---|
| 9,696,687 B2* | 7/2017 | Sung | G03H 1/2294 |
| 10,634,898 B2* | 4/2020 | Togino | G02B 23/06 |
| 10,948,631 B1* | 3/2021 | Yoon | G02B 3/00 |
| 2002/0196534 A1* | 12/2002 | Lizotte | G02B 26/123 |
| | | | 359/362 |
| 2006/0262290 A1 | 11/2006 | Yamaguchi | |
| 2010/0201606 A1* | 8/2010 | Chung | G02B 30/25 |
| | | | 345/8 |
| 2011/0102560 A1* | 5/2011 | Kim | G02B 30/24 |
| | | | 348/56 |
| 2011/0149018 A1* | 6/2011 | Kroll | G03H 1/02 |
| | | | 348/40 |
| 2012/0092735 A1* | 4/2012 | Futterer | G03H 1/08 |
| | | | 359/11 |
| 2014/0008549 A1* | 1/2014 | Theriault | G02B 26/105 |
| | | | 250/459.1 |
| 2014/0232992 A1* | 8/2014 | Egawa | G03B 21/208 |
| | | | 353/30 |
| 2018/0213211 A1* | 7/2018 | Tomizawa | G02B 5/045 |
| 2018/0284282 A1* | 10/2018 | Hong | H01S 5/4012 |
| 2019/0204423 A1* | 7/2019 | O'Keeffe | G01S 17/89 |
| 2020/0256959 A1* | 8/2020 | Philipp | G01S 17/931 |
| 2021/0141158 A1* | 5/2021 | Porter | G02B 6/3526 |
| 2021/0239949 A1* | 8/2021 | Breese | G02B 27/126 |

* cited by examiner

WIDE FIELD-OF-VIEW LIDAR OPTICAL ASSEMBLY AND SYSTEM

TECHNICAL FIELD OF INVENTION

This disclosure generally relates to a lidar system, and more particularly a system that includes a first-optical wedge configured to generally direct laser-beams in a first-direction with respect to a bore-axis of the system, a second-optical-wedge configured to generally direct laser-beams in a second-direction from the first-direction.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
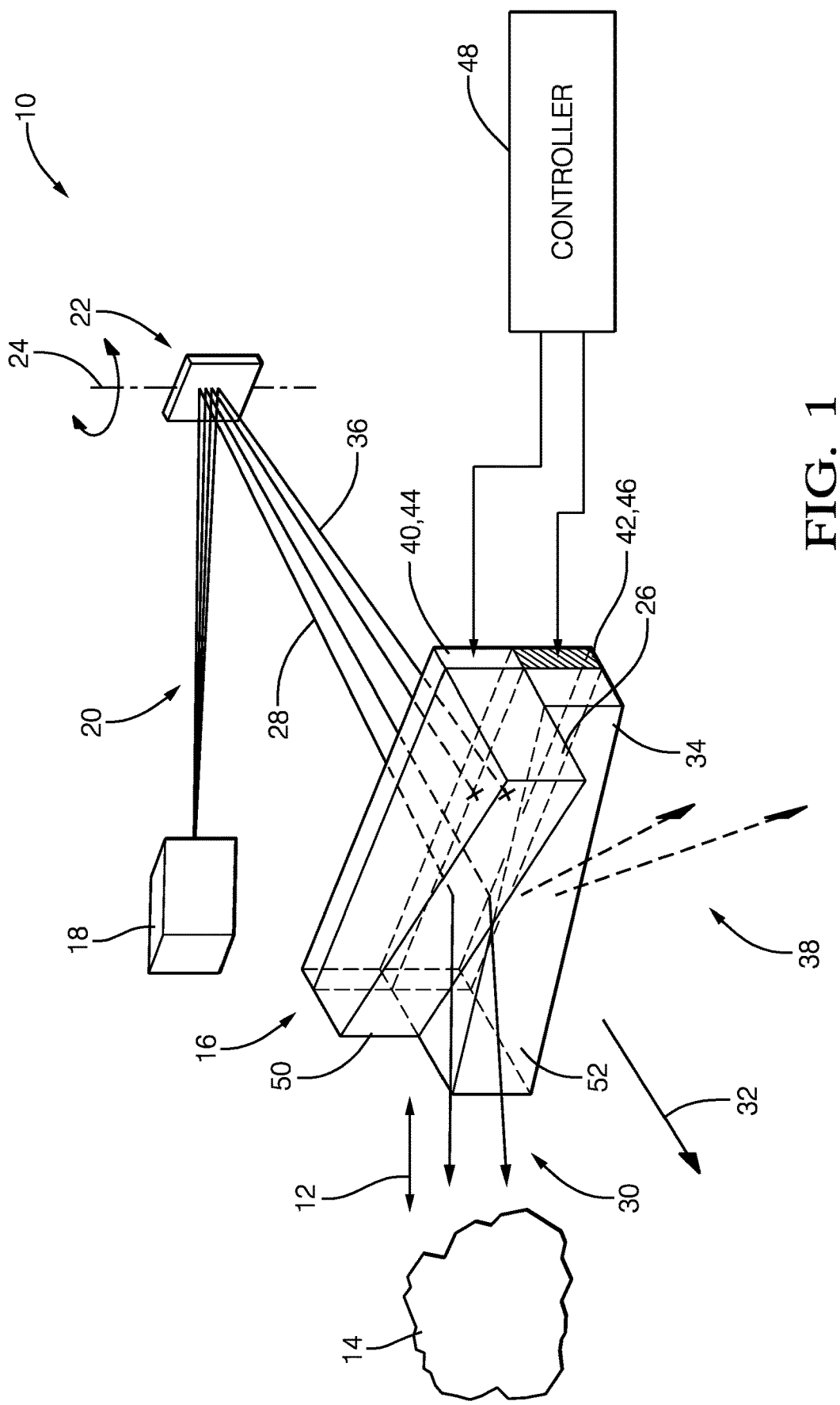
FIG. 1 is an isometric-view and diagram of a lidar system.

FIG. 1 illustrates a non-limiting example of a lidar system 10, hereafter often referred to as the system 10. Lidar, which stands for Light Detection and Ranging, is a remote sensing method that uses light in the form of a pulsed laser to measure a range or a distance 12 an object 14. Lidar is an important object-detection technology for automated vehicles, e.g. either manually driven vehicles with automated driver warning functions, or autonomous vehicle, i.e. driverless vehicles, that can transport people and/or goods without being directly controlled by a human driver. The system 10 described herein is an improvement over prior lidar systems in that a wider field of view is economically provided for a single lidar unit by including an innovative configuration of an optical assembly 16, hereafter often referred to as the assembly 16, which will be described in more detail later.

The system 10 includes a laser-source 18 configured to emit a plurality of laser-beams 20. In this non-limiting example, four laser-beams arranged in a vertical-line arrangement are shown, however those familiar with lidar technology will recognize that many more laser-beams are typically used in commercially available lidar devices, e.g. sixteen or thirty-two laser-beams for example. Four are show only to simplify the illustration. The vertical-line arrangement of laser-beams may be provided by, for example, a linear-array of laser-diodes (not shown), or by a diffuser (not shown) configured to spread or diffuse a single laser-beam into multiple laser-beams, as will be recognized by those in the art. By providing a vertical-line arrangement of laser-beams, then the plurality of laser-beams 20 can be horizontally scanned using a single movable-mirror 22, i.e. a single instance of a movable-mirror 22, hereafter often referred to the movable-mirror 22. The movable-mirror 22 is positioned to reflect the plurality of laser-beams 20 from the laser-source 18 toward the assembly 16. The movable-mirror 22 is operable to pivot about a single rotation-axis 24. That is, the movable-mirror 22 is only capable to pivot or rotate about the single rotation-axis 24, which in this example is oriented vertically so the movable-mirror 22 can only scan or sweep the plurality of laser-beams 20 horizontally.

The movable-mirror 22 is sometimes referred to as a one-dimensional microelectromechanical-mirror-system (1D MEMS) which pivots about only the single rotation-axis 24 is preferable over a 2D MEMS. The 2D MEMS pivots about two orthogonal axes so can be used to scan a single laser-beam both vertically and horizontally. One reason the 1D MEMS is preferable is because of the robustness to vehicular vibration in automotive application when compared to 2D MEMS. Furthermore, the cost of providing and calibrating a 2D MEMS is greater than that of a 1D MEMS plus a means to provide a vertical-line arrangement of laser-beams. Suitable examples of 1D MEMS and 2D MEMS are limited to rotate or pivot about seventy-degree (70°), so can only provide about a seventy-degree (70°) field-of-view, i.e. angle of horizontal deflection. However, for automotive applications, a one-hundred-twenty degree (120°) horizontal field-of-view is desired. Other lidar configurations that use multiple MEMS to provide a wider field of view have been suggested, however these configurations are undesirably expensive and difficult to calibrate. It is recognized that there may be other instances of fixed-mirrors in the path between the laser-source 18 and the object 14. However, it is noted that fixed mirrors are not operable to pivot about any axis, so are not comparable to the movable-mirror 22 described herein.

As suggested above, the system 10 described herein is advantageous over prior lidar systems because of the optical assembly 16, which will now be described. The system 10, or the assembly 16, includes a first-optical wedge 26 configured to direct (i.e. bend) at least a first-laser-beam 28 of the plurality of laser-beams 20 reflected by the movable-mirror 22 in a first-direction 30 with respect to a bore-axis 32 of the system 10. That is, the field-of-view covered by the laser-beams 20 that are passing through the first-optical-wedge 26 are not substantially centered about the bore-axis 32, but are centered about some other direction or vector characterized as the first-direction 30. By way of example and not limitation, the first-direction 30 may be characterized as being nominally plus twenty-five degrees (+25°) horizontal relative to the bore-axis 32, i.e. nominally 25° right of bore-axis. The first-direction 30 may also include a vertical component, as will be discussed later.

To achieve a wider system field-of-view, the system 10, or the assembly 16, also includes a second-optical-wedge 34 configured to direct at least a second-laser-beam 36 of the plurality of laser-beams 20 reflected by the movable-mirror in a second-direction 38 with respect to the bore-axis 32 of the system 10, and thereby complement the direction deflection of the first-optical-wedge 26. The second-direction 38 is different from or is characterized as different from the first-direction 30. By way of example and not limitation, the second-direction 38 may be characterized as being nominally minus twenty-five degrees (−25°) horizontal relative to the bore-axis 32, i.e. nominally 25° left of bore-axis. This non-limiting example of the first-direction 30 and the second-direction 38 being equal magnitude but opposite direction, at least regarding horizontal deflection, the second-direction 38 may be characterized as complementarily-opposed to the first-direction 30. That is, if it is desired that the lidar has a symmetrical field-of-view for projecting laser-beams, then the first-optical-wedge 26 and the second-optical-wedge 34 may be configured (i.e. selected or designed) such that the second-direction 38 is, as used herein, complementarily-opposed to the first-direction 30.

Accordingly, if the movable-mirror 22 is capable of 70° of deflection (i.e. +/−) 35°, and the horizontal deflections of the first-direction 30 and the second-direction 38 are +25° and −25°, respectively, as suggested above, the total horizontal field-of-view of the system 10 will be 120°. In this example, there will be a ten degree (10°) overlap-region, which may be advantageous for sensing distant objects close (e.g.)+/−5° to the bore-axis 32 as twice as many laser-beams may impinge on such an object.

As suggested in FIG. 1, it is contemplated that about half of the laser-beams 20 will pass through the first-optical-wedge 26, and the other half will pass through the second-optical-wedge 34. However, to avoid confusion regarding from which direction one or more laser beams are reflected to a detector (not shown) of the system 10 by the object 14, it is advantageous to time-multiplex the laser-beams 20 passing through the first-optical-wedge 26 and the second-optical-wedge 34. As previously noted, this could be possible using a 2D MEMS, but doing so leads to undesirable expense and complexity. To provide for time-multiplexing, the system 10 or the assembly 16 includes a first-shutter 40 interposed between the first-optical-wedge 26 and the movable-mirror 22, and a second-shutter 42 interposed between the second-optical-wedge 34 and the movable-mirror 22.

The shutters are operable to a transmissive-state (i.e. an open-state or a transparent-state), and a blocking-state (i.e. a closed-state or an opaque-state). FIG. 1 shows the first-shutter 40 in the transmissive-state so that the first-laser-beam 28 passes through the first-shutter 40 and into the first-optical-wedge 26. By contrast, the second-shutter 42 is in the blocking-state so the second-laser-beam 36 is blocked from entering the second-optical-wedge 34. The dashed lines suggesting laser-beams exiting the second-optical-wedge 34 are provided to illustrate the second-direction 38 as being different from the first-direction 30 and should not be interpreted to suggest that laser-beams are being emitted from or passing through the second-optical-wedge 34 while the second-shutter 42 is in the blocking-state. The first-shutter 40 and the second-shutter 42 are independently operable to either state, so it is possible that both could be in the blocking-state or both could be in the transmissive-state, but is it contemplated that normally the states will be alternated, i.e. one of the shutters will be in the blocking-state while the other of the shutters is in the transmissive-state.

In one embodiment of the system 10 or the assembly 16, the first-shutter 40 includes or essentially consists of a first-liquid-crystal-element 44 operable to the transmissive-state and the blocking-state. It is likely that the second-shutter 46 would use a similar technology so that the second-shutter also includes 42 a second-liquid-crystal-element 46 which is independently operable from the first-liquid-crystal-element 44. Likewise, the second-liquid-crystal-element 46 operable to the transmissive-state and the blocking-state. It is recognized that the first-liquid-crystal-element 44 and second-liquid-crystal-element 46 may be part of a unified device such as a liquid-crystal-display or liquid-crystal-device (LCD), but the ability to at least operate each independently to opposing states is required.

The system 10 includes a controller-circuit 48 in communication with, at least, the first-shutter 40 and the second-shutter 42, and may also be in communication with the laser-source 18 and/or the movable-mirror 22 to coordinate emitting the laser-beams 20 in a known direction. Accordingly, the controller-circuit 48 is configured to alternately operate the first-shutter 40 and the second-shutter 42 to the transmissive-state and the blocking-state. The controller-circuit 48, hereafter sometimes referred to as the controller 48, may include one or more instances of a processor (not shown) such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 48, it is recognized that the functions of the controller 48 may be shared or distributed among several instances of controllers that are each configured for some specific task. Hereafter, any reference to the controller 48 being configured for something is to also be interpreted as suggesting that the processor may also be configured for the same thing. It is also recognized that there may be multiple instances of processors in any instance of the controller 48. The controller 48 may include memory (not shown), i.e. non-transitory computer-readable storage-medium, including non-volatile memory, such as electrically erasable programmable read-only memory (EEPROM) for storing one or more routines, thresholds, and captured data. The memory may be part of the processor, or part of the controller 48, or separate from the controller 48 such as remote memory stored in the cloud. The one or more routines may be executed by the controller 48 or the processor to perform steps for determining the distance 12 to the object 14 based on signals received by the controller 48 from, for example, a laser detector (not shown), as will be recognized by those in the art.

Figure 2:
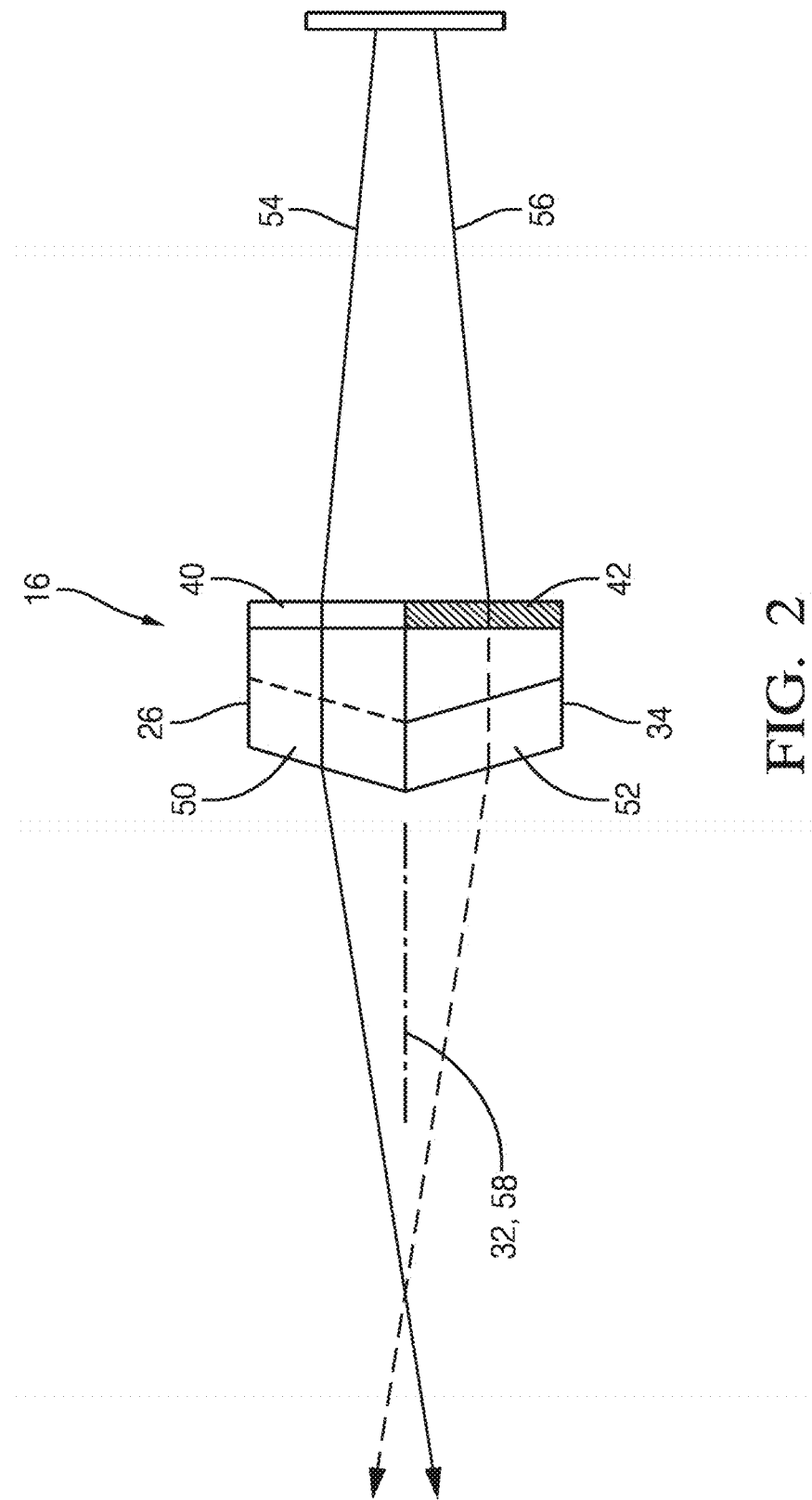
FIG. 2 is a side-view of an optical assembly of the system of FIG. 1 in accordance with one embodiment.

FIG. 2 illustrates a non-limiting example of a side-view of the assembly 16. As previously mentioned, the first-direction 30 and/or the second-direction 38 may also be characterized by some vertical deflection up or down in addition to the horizontal deflection described above. It is contemplated that for many applications it will be desirable to have the fields-of-view of the first-optical-wedge 26 and the second-optical-wedge 34 vertically overlap each other as much as possible. That is, for the configuration shown in FIG. 1 the first-direction 30 may include some downward deflection and the second-direction 38 may some upward deflection so that the relative detected height of the object 14 remains relatively constant if the object 14 moves horizontally from the field-of-view of one of the optical-wedges into the field-of-view of the other of the optical-wedges.

To that end, the first-optical-wedge 26 defines (i.e. are configured to define or includes) a first-surface 50 and the second-optical-wedge 34 defines a second-surface 52. The first-surface 50 and the second-surface 52 are oriented relative to each other such that a third-laser-beam 54 that passes through the first-surface 50 and a fourth-laser-beam 56 that passes through the second-surface 52 intersect a horizontal-plane 58 parallel to the bore-axis 32. Because the horizontal-plane 58 is viewed from an edge, the horizontal-plane 58 appears as a line in FIG. 2. The horizontal-plane 58 is shown as being coincident with the bore-axis 32, however this is not a requirement. The third-laser-beam 54 and a fourth-laser-beam 56 are likely not vertically aligned, i.e. are not reflected by the movable-mirror 22 at the same instant in time or while the movable-mirror 22 is at the same angle. More broadly, it may be said that angling of the first-surface 50 and the second-surface 52 are selected or configured such that the fields-of-view of the first-optical-wedge 26 and the second-optical-wedge 34 are vertically aligned, and the best vertical alignment would occur at some selected distance from the assembly 16.

By way of further description and example, the first-surface 50 and the second-surface 52 may be configured or oriented relative to each other such that the third-laser-beam 54 and the fourth-laser-beam 56 intersect at some selected distance from the assembly 16. For the configuration of the assembly 16 shown in FIGS. 1 and 2, and with the understanding of there being a ten degree (10°) overlap-region, for the third-laser-beam 54 and the fourth-laser-beam 56 intersect, the third-laser-beam 54 would pass through the first-optical-wedge 26 at one end of the assembly 16, and the fourth-laser-beam 56 would pass through the second-optical-wedge 34 at the opposite end of the assembly 16.

Accordingly, a lidar system (the system 10), and a controller 48 for the system 10 are provided. The assembly 16, which includes the two optical wedges and the two shutters enable the lidar to have a wider field-of-view (wider than the range of angles available from the movable-mirror 22) without the added and undesirable complexity and cost of using multiple instances of movable-mirrors and/or using 2D MEMS.

While this invention has been described in terms of the preferred embodiments thereof, it is not intended to be so limited, but rather only to the extent set forth in the claims that follow.

I claim:

1. An optical assembly for a lidar system comprising:
    a first-optical wedge configured to direct a reflection of at least a first-laser-beam of a plurality of laser-beams from a single movable-mirror in a first-direction with respect to a bore-axis of the system;
    a second-optical-wedge configured to direct another reflection of at least a second-laser-beam of the plurality of laser-beams from the single movable-mirror in a second-direction with respect to the bore-axis of the system, the second-direction being different than the first-direction;
    a first-shutter interposed between the first-optical-wedge and a laser-source that emits the first-laser-beam, the first-shutter operable to a transmissive-state and a blocking-state;
    a second-shutter interposed between the second-optical-wedge and the laser-source that emits the second-laser-beam, the second-shutter operable to a transmissive-state and a blocking-state independent of the operability of the first shutter as a way to coordinate emissions of the plurality of laser-beams to achieve a field of view that includes a wider range of angles than the single movable-mirror.

2. The assembly in accordance with claim 1, wherein the first-shutter includes a first-liquid-crystal-element operable to the transmissive-state and the blocking-state.

3. The assembly in accordance with claim 2, wherein the second-shutter includes a second-liquid-crystal-element independent of the first-liquid-crystal-element, the second-liquid-crystal-element operable to the transmissive-state and the blocking-state.

4. The system of claim 1, wherein the first-optical-wedge and the second-optical-wedge are placed in a vertical arrangement, and wherein the first-direction and the second-direction are on parallel planes to the plane of the bore-axis.

5. The system of claim 1, wherein the movable-mirror is configured to rotate up to seventy degrees about a rotation-axis.

6. The system of claim 1, wherein the first direction is plus twenty-five degrees horizontal relative to the bore-axis, and the second direction is minus twenty-five degrees horizontal relative to the bore-axis.

7. The assembly in accordance with claim 1, wherein the second-direction is complementarily-opposed to the first-direction.

8. The assembly in accordance with claim 1, wherein the first-optical-wedge defines a first-surface and the second-optical-wedge defines a second-surface, and the first-surface and the second-surface are oriented relative to each other such that a third-laser-beam that passes through the first-surface and a fourth-laser-beam different from the third-laser-beam and that passes through the second-surface intersect a horizontal-plane parallel to the bore-axis.

9. The assembly in accordance with claim 8, wherein the first-surface and the second-surface are oriented relative to each other such that the third-laser-beam and the fourth-laser-beam intersect.

10. A lidar system comprising:
    a laser-source configured to emit a plurality of laser-beams;
    a single movable-mirror operable to pivot about a single rotation-axis, and positioned to reflect the plurality of laser-beams in response to the plurality of laser-beams emitted from the laser-source;

a first-optical wedge positioned to direct a reflection of at least a first-laser-beam of the plurality of laser-beams from the single movable-mirror in a first-direction with respect to a bore-axis of the system, the bore-axis of the system being different than the single rotation-axis of the single movable-mirror;

a second-optical-wedge positioned to direct another reflection of at least a second-laser-beam of the plurality of laser-beams from the single movable-mirror in a second-direction with respect to the bore-axis that is different than the first-direction;

a first-shutter interposed between the first-optical-wedge and the single movable-mirror;

a second-shutter interposed between the second-optical-wedge and the single movable-mirror; and a controller-circuit in communication with the first-shutter and the second-shutter, and configured to:

independently control the first-shutter and the second-shutter to operate each shutter in either a transmissive-state or a blocking-state as a way to coordinate emissions of the plurality of laser-beams to achieve a field of view that includes a wider range of angles than the single movable-mirror; and output lidar data for measuring range or distance to objects detected in the field of view including at least one object that is detected outside an angular range of the single movable mirror.

11. The system of claim 10, wherein the first-optical-wedge and the second-optical-wedge are placed in a vertical arrangement, and wherein the first-direction and the second-direction are on parallel planes to the plane of the bore-axis.

12. The system of claim 10, wherein the single movable-mirror is configured to rotate up to seventy degrees about the rotation-axis.

13. The system of claim 10, wherein the first direction is plus twenty-five degrees horizontal relative to the bore-axis, and the second direction is minus twenty-five degrees horizontal relative to the bore-axis.

14. The system of claim 10, wherein the controller-circuit is further configured to time-multiplex the transmissive-state and the blocking-state of the first-shutter and the second-shutter.

15. The system of claim 10, wherein the laser-source is configured to emit at least the first-laser-beam and the second-laser-beam in a vertical-line arrangement.

16. The system in accordance with claim 10, wherein the first-shutter includes a first-liquid-crystal-element operable to the transmissive-state and the blocking-state.

17. The system in accordance with claim 16, wherein the second-shutter includes a second-liquid-crystal-element independent of the first-liquid-crystal-element, the second-liquid-crystal-element operable to the transmissive-state and the blocking-state.

18. The system in accordance with claim 10, wherein the second-direction is complementarily-opposed to the first-direction.

19. The system in accordance with claim 10, wherein the first-optical-wedge defines a first-surface and the second-optical-wedge defines a second-surface, and the first-surface and the second-surface are oriented relative to each other such that a third-laser-beam that passes through the first-surface and a fourth-laser-beam that passes through the second-surface intersect a horizontal-plane parallel to the bore-axis.

20. The system in accordance with claim 19, wherein the first-surface and the second-surface are oriented relative to each other such that the third-laser-beam and the fourth-laser-beam intersect.

* * * * *